Oct. 23, 1956 H. T. JENKINS 2,767,545
COMBINATION CULTIVATOR-RAKE
Filed Feb. 10, 1951
2 Sheets-Sheet 1
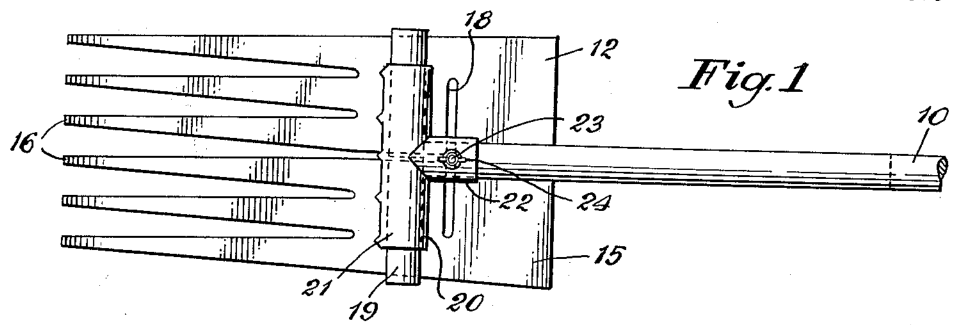
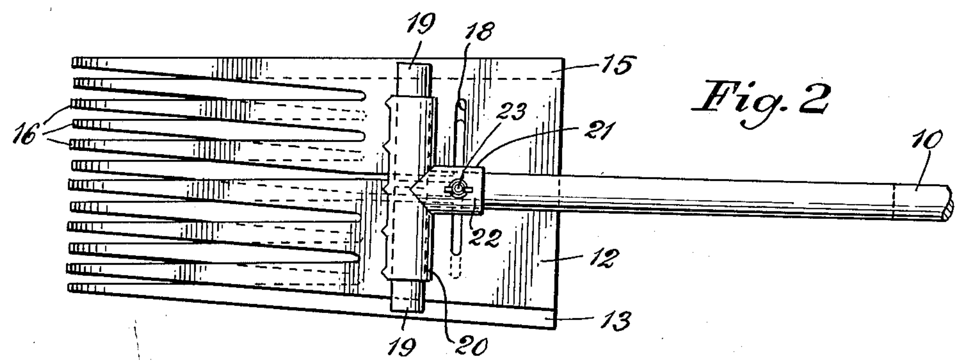
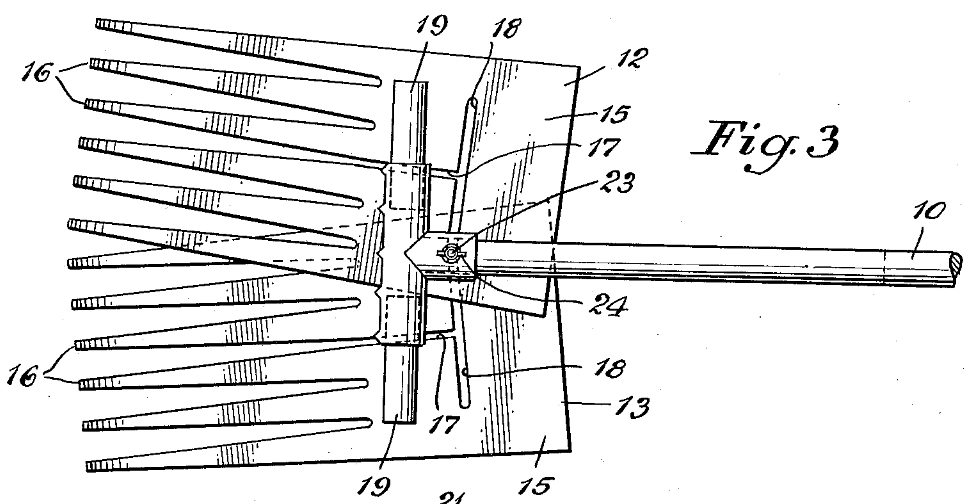
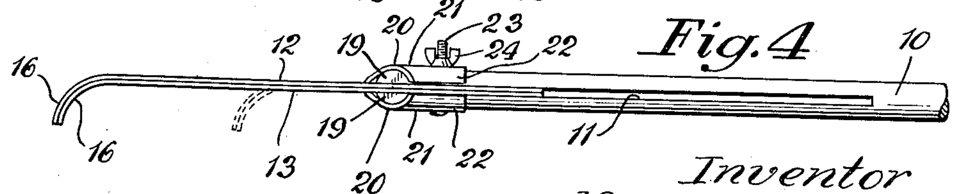
Inventor
Homer T. Jenkins
by Parker & Carter
Attorneys Fig. 5
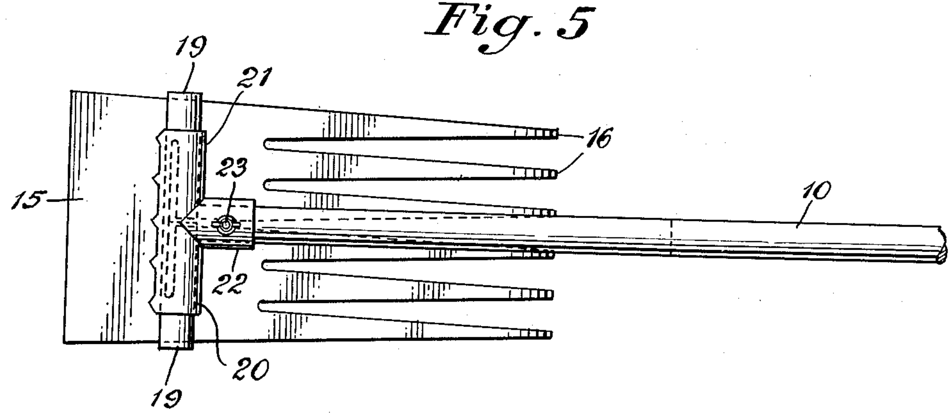
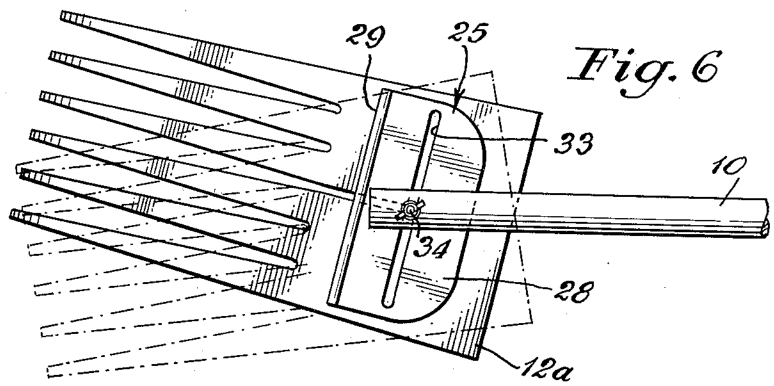
Fig. 7
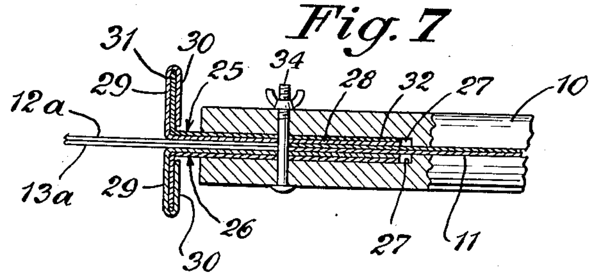
Inventor
Homer T. Jenkins
by Parker & Carter
Attorneys United States Patent Office 2,767,545

Patented Oct. 23, 1956

2,767,545

COMBINATION CULTIVATOR-RAKE

Homer T. Jenkins, Chicago, Ill.

Application February 10, 1951, Serial No. 210,443

3 Claims. (Cl. 56—400.06)

This invention relates to improvements in a combination tool or cultivator-rake adapted for adjustment so as to be used for many purposes, such as cultivating, raking, scraping, ice chipping, hedge cleaning, or the like.

The principal object of the invention is to provide a simple, efficient, and relatively inexpensive tool of the character described, having an elongated handle and a blade member readily adjustable to various dimensions and arrangements, and with tines spaced at varying distances to serve the many purposes for which it can be adapted.

A further object is to provide a combination tool of the character described which is adjustable as to spring tension of its tines, and as to angle to its handle, so as to serve as a hoe, scraper, cultivator or rake, as desired by the user.

In carrying out my invention, I provide a handle and blade support for two lapped blades of sheet material of substantially similar conformation, including integral prongs or tines, which blades can be set in substantial registry with each other in one position of adjustment, or can be telescopically expanded laterally with respect to each other in another position of adjustment, for varying the width of the blade as a whole, and also for varying the number and spacing of the tines effective for different purposes, as desired.

I further provide means affording longitudinal adjustment of the two blades relative to their supporting means so as to vary the spring tension effective on the ends of the prongs or tines, either in laterally offset relation to each other or in mutually lapped relation with each other.

Other objects and advantages of the invention will appear from time to time as the following description proceeds.

The invention may best be understood by reference to the accompanying drawings, in which:

Figure 1 is a top plan view of one form of tool constructed in accordance with my invention, with a portion of the handle broken away;

Figure 2 is a view similar to Figure 1, but showing the superimposed blades of the tool adjusted laterally to provide a wider working end, with the prongs or tines of the two blades now in offset relation to each other so as to present twice the number of working prongs at substantially one-half the space of the tool adjustment shown in Figure 1;

Figure 3 is a plan view of the tool shown in the preceding figures, but with the blades now spread at a still greater angle to each other so as to present a working end of substantially twice the width of the tool arranged as shown ni Figure 1, and with twice the number of prongs in operative position;

Figure 4 is a side view of the tool shown in Figure 1;

Figure 5 is a view of the tool shown in the preceding figures, but with the blades mounted in endwise reversed position so that it is more particularly adapted for use as a scraper or as an ice chipper;

Figure 6 is a plan view of a modified form of tool, in which a slightly different adjustable supporting means is provided for the blades;

Figure 7 is an enlarged detailed section taken longitudinally of the base of the blade in the form of device shown in Figure 6.

Referring now to details of the embodiment of my invention shown in Figures 1 to 5 of the drawings, an elongated handle 10 of wood or the like is provided with a longitudinally extending slot 11 at the tool supporting end thereof for receiving a pair of similar sheet metal plates 12 and 13 in mutually lapped relation to each other to permit telescoping movement of said plates with respect to the handle, as indicated in full and dotted lines in Figure 4. The plates 12 and 13 are made of sheet material and preferably of spring steel, although for some purposes said plates may be made of other materials such as plastic, fiber or the like. In the form shown, the plates 12 and 13 are substantial duplicates of each other, each comprising a base 15 having a plurality of prongs 16, 16 preferably bent at their ends through an arc of approximately 45 degrees to the plane of the plate. The number of prongs may vary, there being six prongs shown in the illustrative embodiment of these figures.

In the form shown herein, the plates 12 and 13 are slightly wider at their base and taper forwardly along opposite sides to their pronged ends. The two plates 12 and 13 together form the working blade of the tool. When the plates are disposed in mutual registering relation with each other as shown in Figure 1, the prongs 16, 16 of the two plates are likewise in mutual registering relation.

The bases 15 of the two plates are each provided with a centrally disposed elongated slot 17, herein opening to the space between the two centermost prongs 16 and extending to approximately the center of the base. A transversely extending slot 18 interconnects with the rear end of the slot 17 in each plate.

The two plates are supported in clamped, lapped relation to each other by a pair of opposed transversely extending, two-piece bars 19, 19, substantially semicircular in cross-section, and each engaged in opposed cross members 20 of T-shaped clamping members 21, 21. Said clamping members 21 also have integral shanks 22, 22 through which a threaded through bolt 23 is passed, said through bolt also passing through one or the other of the interconnecting slots 17, 18 depending upon the position of adjustment of the plates desired by the user. A wing nut 24 on one end of the threaded bolt 23 provides clamping action to hold the plates 12 and 13 together in any one of several relative positions, some of which may now be described with reference to Figures 1 to 5.

In Figure 1, the tool is shown with the plates 12 and 13 in mutually registering relation, both with respect to their prongs 16 and their bases 15. The through bolt 23 in this figure is disposed at the juncture of the slots 17 and 18, and the handle 10 is disposed on the same longitudinal axis as the plates. In this position, the two plates 12 and 13 combine to form a single working blade having six prongs of double thickness, but with the blade of minimum width so as to be especially effective for use as a rake or hedge cleaner with relatively widely spaced prongs at the working end of the blade.

The plates can be readily readjusted in various positions relative to the clamping members 21; as for instance indicated in dotted lines in Figure 4, where the plates are telescopically moved into the slot 11 in the handle so that, when the plates are clamped by wing nut 24, only a relatively short portion of the tines 16 project beyond the cross bars 19 so as to reduce the yielding action of the tines as desired.

Figure 2 shows another position of adjustment wherein the two plates are spread laterally with respect to each other and the tines 16, 16 of the two plates are now in staggered relation to each other instead of being in mutual registry. This adjustment doubles the number of tines and decreases the spacing between the adjacent tines, as may be desirable for certain uses; as for instance in raking relatively small debris, such as acorn seeds and the like.

Figure 3 shows still another position of adjustment of the plates wherein the plates are now spread apart and also fanned out from each other along their pronged ends so as to greatly increase the effective working width of the blade. In this position of adjustment, the through bolt 23 is positioned at the extreme ends of the transverse slots 18, 18 in the plates 12 and 13, respectively. It will also be noted that each of the two-piece cross bars 19, 19 may be separated at their centers so that opposite end portions of said bars are extended laterally in the cross members 20 to provide additional supporting engagement for the outer edges of the two plates 12 and 13.

In the position of adjustment shown in Figure 5, the two plates 12 and 13 are again in registering relation with each other as shown in Figure 1, but the plates are clamped in reversed position relative to the handle 10 and with the through bolt 23 disposed in an intermediate portion of the longitudinal slot 17 of the plates. In this position, the blunt ends of the bases 15 may be used as scrapers or ice chippers. It will also be understood that the clamping members 21 and through bolt 23 can be positioned nearer the squared end of the plate, this adjustment being limited only by the movement of the through bolt 23 to the end of the center slot 17. This latter adjustment may be especially desirable when the tool is used as an ice chipper since the through bolt 23 is then in direct engagement with the end of the slot 17.

In addition to the various adjustments of the two plates which together form the working blade as above described, wherein the prongs of both plates project in the same direction, it will be understood that the two plates are reversible with respect to each other, if desired, so that said plates are in back-to-back relation to each other, with the prongs extending in opposite directions. The plates are adjustable in such back-to-back relation, both laterally and longitudinally, in the same manner as previously described in connection with the form of device shown in Figures 1 to 5, inclusive. Such back-to-back adjustment is particularly useful when the tool is to be used with a two-way sweeping motion, in much the same manner as a broom.

In the modified form of device shown in Figures 6 and 7, the general form of the cooperating plates 12*a*, 13*a* is the same as described in connection with the foregoing figures, but the clamping means therefor includes two sets of lapping cross members 25 and 26 of sheet metal, each extending transversely of the blades above and below the latter. The central portions of each of these sets of cross members are adapted to extend into widened slot portions 27, 27 at the end of the open slot 11 of the handle 10. Since the two sets of cross members 25 and 26 are similar, a description of one will suffice for both. Each cross member 25 consists of an inner sheet metal plate 28 having an outwardly turned flange 29 along its outer end. Said flange 29 has an inwardly turned terminal web 30 forming a channel in which the flange 31 of the companion outer member 32 is slidably mounted. The upper and lower cross members have similar transverse slots 33 formed therein.

A through bolt 34 extends through the handle 10, the slots 33 in the upper and lower cross members 25 and 26, and the slots 17 or 18 of the plates 12*a* and 13*a*.

The arrangement just described is such that the plates 12*a* and 13*a* may be given substantially the same lateral and longitudinal adjustment as that previously described in connection with the form of tool shown in Figures 1 to 5.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a tool of the character described, an elongated handle, a blade consisting of two normally lapped plates of similar shape, each having a base with prongs extending from one end thereof, said bases also having similar laterally extending slots therein, and supporting means for said plates on the end of said handle including opposed clamping members engageable with opposite faces of said plates, a through bolt connecting said clamping members and passing through said slots to permit both lateral and angular adjustment of said bases relative to said clamping means and to vary the relative spacing and angular relation of said prongs, and said plates also having similar centrally disposed, longitudinally extending slots in their bases interconnecting with the laterally extending slots to permit longitudinal adjustment of said blades relative to said clamping members.

2. A tool in accordance with claim 1, wherein the longitudinal slots in the bases of said plates are open to the pronged ends of their respective plates to permit the latter to be reversible end to end in the clamping members to present the bases of said plates as the working edge of the blade.

3. In a tool of the character described, an elongated handle, a blade consisting of a generally flat plate with a series of prongs extending longitudinally of the plate and disposed at one end of the plate, there being a space between adjacent prongs, and supporting means for said plate on the end of said handle including opposed clamping members engageable with opposite faces of said plate, a through bolt connecting said clamping members and passing through the space between said prongs to permit both longitudinal and angular adjustment of said blade relative to said clamping members, the space between said adjacent prongs being of greater length than said adjacent prongs and extending into the body of said plate.

References Cited in the file of this patent

UNITED STATES PATENTS

| | | |
|---|---|---|
| 80,765 | Quackenbush | Aug. 4, 1868 |
| 705,689 | Magee | July 29, 1902 |
| 938,639 | Carpenter | Nov. 2, 1909 |
| 1,161,627 | De Falco | Nov. 23, 1915 |
| 1,372,558 | Saxl | Mar. 22, 1921 |
| 1,578,532 | Lagorio | Mar. 30, 1926 |
| 1,607,037 | Barnes | Nov. 16, 1926 |
| 1,916,052 | Jenkins | June 27, 1933 |
| 2,030,183 | Rocquin | Feb. 11, 1936 |
| 2,033,451 | Rose | Mar. 10, 1936 |
| 2,211,379 | MacIvor | Aug. 13, 1940 |